(12) United States Patent
Jacobsen et al.

(10) Patent No.: US 8,197,930 B1
(45) Date of Patent: *Jun. 12, 2012

(54) THREE-DIMENSIONAL ORDERED OPEN-CELLULAR STRUCTURES

(75) Inventors: Alan J. Jacobsen, Los Angeles, CA (US); William B. Barvosa-Carter, Ventura, CA (US)

(73) Assignee: HRL Laboratories, LLC, Malibu, CA (US)

(*) Notice: Subject to any disclaimer, the term of this patent is extended or adjusted under 35 U.S.C. 154(b) by 959 days.

This patent is subject to a terminal disclaimer.

(21) Appl. No.: 11/801,908

(22) Filed: May 10, 2007

(51) Int. Cl.
 *B32B 3/26* (2006.01)
 *G02B 6/10* (2006.01)
(52) U.S. Cl. ............... 428/315.5; 428/315.7; 385/129; 385/131; 430/290; 430/396
(58) Field of Classification Search ............ 428/315.5, 428/315.7; 385/129, 130, 131; 430/290, 430/396
See application file for complete search history.

(56) References Cited

U.S. PATENT DOCUMENTS

| | | |
|---|---|---|
| 4,219,597 A | 8/1980 | Maistre |
| 4,400,421 A | 8/1983 | Stover |
| 4,568,595 A | 2/1986 | Morris |
| 4,575,330 A | 3/1986 | Hull |
| 4,722,089 A * | 1/1988 | Botez et al. ............. 372/50.123 |
| 5,006,937 A | 4/1991 | Nonoshita et al. |
| 5,185,297 A | 2/1993 | Park et al. |
| 5,265,185 A | 11/1993 | Ashley |
| 5,394,490 A | 2/1995 | Kato et al. |
| 5,401,694 A | 3/1995 | Gesing et al. |
| 5,402,514 A | 3/1995 | Booth et al. |
| 5,932,397 A | 8/1999 | Mustacich |
| 6,176,874 B1 | 1/2001 | Vacanti et al. |
| 6,274,288 B1 | 8/2001 | Kewitsch et al. |
| 6,341,190 B1 | 1/2002 | Summersgill et al. |
| 6,379,962 B1 | 4/2002 | Holy et al. |
| 6,387,593 B1 | 5/2002 | Kewitsch et al. |
| 6,472,210 B1 | 10/2002 | Holy et al. |
| 6,500,401 B2 | 12/2002 | Reznek et al. |
| 6,510,260 B2 * | 1/2003 | Chen et al. .................. 385/17 |
| 6,592,787 B2 | 7/2003 | Pickrell et al. |
| 6,631,231 B2 | 10/2003 | Mizuuchi et al. |
| 6,650,817 B2 | 11/2003 | Murali |
| 6,660,192 B1 | 12/2003 | Kim et al. |
| 6,670,039 B1 | 12/2003 | Nagle et al. |
| 6,684,007 B2 | 1/2004 | Yoshimura et al. |
| 6,823,116 B2 | 11/2004 | Inui et al. |

(Continued)

OTHER PUBLICATIONS

Office Action, dated Apr. 4, 2007, for U.S. Appl. No. 11/580,335, 16 pages.

(Continued)

*Primary Examiner* — Hai Vo
(74) *Attorney, Agent, or Firm* — Christie, Parker, Hale (57) ABSTRACT

A three-dimensional ordered open-cellular structure. In one embodiment, the structure includes: a plurality of first truss elements defined by a plurality of first self-propagating polymer waveguides and extending along a first direction; a plurality of second truss elements defined by a plurality of second self-propagating polymer waveguides and extending along a second direction; and a plurality of third truss elements defined by a plurality of third self-propagating polymer waveguides and extending along a third direction. The first, second, and third truss elements interpenetrate each other at a plurality of nodes to form a continuous material, and the three-dimensional structure is self-supporting.

24 Claims, 7 Drawing Sheets

U.S. PATENT DOCUMENTS

| | | | |
|---|---|---|---|
| 6,862,393 B2 | 3/2005 | Nashimoto | |
| 6,870,976 B2 | 3/2005 | Chen et al. | |
| 6,875,442 B2 | 4/2005 | Holy et al. | |
| 6,879,757 B1 | 4/2005 | Zhou et al. | |
| 6,887,809 B1 | 5/2005 | Adler | |
| 6,898,362 B2 | 5/2005 | Forbes et al. | |
| 6,925,233 B2 | 8/2005 | Inui et al. | |
| 6,932,880 B2 | 8/2005 | Inui et al. | |
| 6,941,888 B2 | 9/2005 | Barsoum | |
| 6,952,504 B2 | 10/2005 | Bi et al. | |
| 6,993,235 B2 | 1/2006 | Takagi et al. | |
| 6,993,406 B1 | 1/2006 | Cesarano, III et al. | |
| 7,006,747 B2 | 2/2006 | Escuti et al. | |
| 7,014,661 B2 | 3/2006 | Blunn et al. | |
| 7,020,374 B2 | 3/2006 | Talin et al. | |
| 7,022,522 B2 | 4/2006 | Guan et al. | |
| 7,024,093 B2 | 4/2006 | Shelnut et al. | |
| 7,085,467 B2 | 8/2006 | Ikemoto et al. | |
| 7,209,622 B2 | 4/2007 | Hoshi et al. | |
| 7,382,959 B1 | 6/2008 | Jacobsen | |
| 7,421,159 B2 | 9/2008 | Yang et al. | |
| 7,531,120 B2 | 5/2009 | Van Rijn et al. | |
| 7,582,394 B2 | 9/2009 | Noda et al. | |
| 7,609,922 B2 * | 10/2009 | Aoki et al. | 385/49 |
| 7,653,276 B1 * | 1/2010 | Gross et al. | 385/46 |
| 7,653,279 B1 * | 1/2010 | Jacobsen | 385/129 |
| 7,687,132 B1 * | 3/2010 | Gross et al. | 428/116 |
| 7,901,462 B2 | 3/2011 | Yang et al. | |
| 7,938,989 B1 | 5/2011 | Gross et al. | |
| 2004/0021237 A1 | 2/2004 | Shimizu et al. | |
| 2004/0154252 A1 | 8/2004 | Sypeck et al. | |
| 2004/0200417 A1 | 10/2004 | Hanawa et al. | |
| 2004/0253365 A1 | 12/2004 | Warren et al. | |
| 2004/0264863 A1 | 12/2004 | Suzuki et al. | |
| 2005/0135745 A1 | 6/2005 | Greiner et al. | |
| 2005/0202206 A1 | 9/2005 | Wadley et al. | |
| 2005/0255289 A1 | 11/2005 | Wadley | |
| 2005/0287696 A1 | 12/2005 | Dumais et al. | |
| 2006/0029348 A1 | 2/2006 | Kempen et al. | |
| 2006/0029349 A1 | 2/2006 | Hoshi et al. | |
| 2006/0080835 A1 | 4/2006 | Kooistra et al. | |
| 2007/0196066 A1 | 8/2007 | Wang et al. | |

OTHER PUBLICATIONS

Office Action, dated Dec. 17, 2007, for U.S. Appl. No. 11/580,335, 8 pages.
Notice of Allowance, dated Feb. 14, 2008, for U.S. Appl. No. 11/580,335, 6 pages.
Office Action, dated Feb. 23, 2009, for U.S. Appl. No. 12/156,380, 9 pages.
Notice of Allowance, dated Sep. 24, 2009, for U.S. Appl. No. 12/075,033, 7 pages.
Notice of Allowance, dated Nov. 17, 2009, for U.S. Appl. No. 12/074,727, 9 pages.
U.S. Notice of Allowance for related U.S. Appl. No. 12/156,380, dated Sep. 18, 2009, 9 pages.
U.S. Notice of Allowance for related U.S. Appl. No. 12/589,262, dated Sep. 8, 2010, 8 pages.
U.S. Office Action for related U.S. Appl. No. 12/109,262, dated Jul. 6, 2011, 14 pages.
U.S. Notice of Allowance for related U.S. Appl. No. 12/109,262, dated Dec. 28, 2011, 7 pages.
Kewitsch et al., "Nonlinear Optical Properties of Photoresists for Projection Lithography", Applied Physics Letters, Jan. 22, 1996, 455-457, vol. 68 (No. 4), USA.
Shoji et al., "Optically-Induced Growth of Fiber Patterns into a Photopolymerizable Resin", Applied Physics Letters, Aug. 2, 1999, 737-739, vol. 75 (No. 5), USA.
Kagami et al., "Light-Induced Self-Written Three-Dimensional Optical Waveguide", Applied Physics Letters, Aug. 20, 2001, 1079-1081, vol. 79 (No. 8), USA.
Bertsch et al., "Microstereolithography: A Review", Materials Research Symposium Proceedings, 2003, 1-13, vol. 758, USA.
Sun et al., "Two-Photon Photo Polymerization and 3D Lithographic Microfabrication", APS, 2004, 169-273, vol. 170, USA.
Chuang et al., "A New Method to Fabricate Polymer Waveguides", Progress in Electromagnetics Research Symposium, Aug. 22-26, 2005, 92-95, Hangzhou, China.
Jang et al., "3D Polymer Microframes That Exploit Length-Scale-Dependent Mechanical Behavior", Advanced Materials, 2006, 2123-2127, vol. 18.

* cited by examiner

FIG. 7

THREE-DIMENSIONAL ORDERED OPEN-CELLULAR STRUCTURES

CROSS-REFERENCE TO RELATED PATENT APPLICATION

This application contains subject matter that is related to U.S. patent application Ser. No. 11/580,335, filed on Oct. 13, 2006, entitled "Optically Oriented Three-Dimensional Polymer Microstructures." The entire content of the above-referenced application is incorporated herein by reference.

FIELD OF THE INVENTION

The present invention relates to three-dimensional ordered open-cellular structures.

BACKGROUND OF THE INVENTION

An ordered three-dimensional (3D) microstructure is an ordered 3D structure at the micrometer scale. Such a microstructure can be formed, for example, by using a stereolithography technique, which relies on a bottom-up, layer-by-layer approach. This process usually involves a platform (substrate) that is lowered into a photo-monomer (photopolymer) bath in discrete steps. At each step, a laser is scanned over the area of the photo-monomer that is to be cured (polymerized) for that particular layer. Once the layer is cured, the platform is lowered a specific amount (determined by the processing parameters and desired feature/surface resolution) and the process is repeated until the full 3D structure is created.

3D ordered polymer cellular structures have also been created using optical interference pattern techniques, also called holographic lithography; however, structures made using these techniques have an ordered structure at the nanometer scale and the structures are limited to the possible interference patterns, as described in Campbell et al., "Fabrication Of Photonic Crystals For The Visible Spectrum By Holographic Lithography," NATURE, Vol. 404, Mar. 2, 2000, which is incorporated by reference herein in its entirety.

Another example of a cellular structure is disclosed in Jang et al., "3D Polymer Microframes That Exploit Length-Scale-Dependent Mechanical Behavior," Advanced Materials, Vol. 18, Issue 16, August 2006, which is incorporated by reference herein in its entirety. Jang et al. discloses a use of holographic interference lithography (IL) to create a 3D polymer microframe. As described above, structures created using such a technique are limited to the possible interference patterns.

Another example of a cellular structure is disclosed in Sypeck et al., "Multifunctional Periodic Cellular Solids And The Method Of Making Same," U.S. Patent Application Publication No. 2004/0154252, Aug. 12, 2004, which is incorporated by reference herein in its entirety. Sypeck et al. discloses bonding truss elements to each other by solid state, liquid phase, pressing or other methods at points of contact to form a cellular structure of highly repeatable cell geometry. However, the bonding approach is based on a layer-by-layer approach.

Another example of a cellular structure is disclosed in Wadley et al., "Method For Manufacture Of Periodic Cellular Structure And Resulting Periodic Cellular Structure," U.S. Patent Application Publication No. 2005/0202206, Sep. 15, 2005, which is incorporated by reference herein in its entirety. Publication No. 2005/0202206 discloses a lightweight periodic cellular structure having a stacked array of hollow or solid structural elements that are bonded at their contact points in order to form a stacked lattice structure. Further arrays may be stacked onto the stacked lattice structure in order to form a periodic cellular structure of varying thickness and depth. However, bonding the structural elements at their contact points is also based on a layer-by-layer approach.

Another example of a cellular structure is disclosed in Wadley et al., "Method For Manufacture Of Cellular Materials And Structures For Blast And Impact Mitigation And Resulting Structure," U.S. Patent Application No. 2005/0255289, Nov. 17, 2005, which is incorporated by reference herein in its entirety. Publication No. 2005/0255289 discloses a method of constructing a structure. The method includes bonding cellular housings together to form at least a first array. The method may include bonding multiple arrays together or in communication with one another. However, the bonding method is also based on a layer-by-layer approach.

Another example of a cellular structure is disclosed in Kooistra et al., "Methods For Manufacture Of Multilayered Multifunctional Truss Structures And Related Structures There From," U.S. Patent Application No. 2006/0080835, Apr. 20, 2006, which is incorporated by reference herein in its entirety. Kooistra et al. discloses a multilayered truss core that may be created from a single planar preform. Once the desired preform is manufactured it is then deformed into a three-dimensional (3D) truss network. While this deformation approach bypasses the need to stack and join monolayer truss cores, it requires that the single planar preform first be manufactured and then be deformed. Moreover, a key to the deformation process is to ensure that the preform is in its ductile temperature regime.

As such, there continues to be a need for more simply manufactured open-cellular structures having an ordered microstructure.

SUMMARY OF THE INVENTION

An aspect of embodiments of the present invention is directed towards three-dimensional ordered open-cellular structures.

Another aspect of embodiments of the present invention is directed towards three-dimensional ordered open-cellular structures on a micrometer scale.

Another aspect of embodiments of the present invention is directed towards three-dimensional ordered open-cellular structures having superior mechanical properties.

In one embodiment of the present invention, a three-dimensional ordered open-cellular structure includes: a plurality of first truss elements defined by a plurality of first self-propagating polymer waveguides and extending along a first direction; a plurality of second truss elements defined by a plurality of second self-propagating polymer waveguides and extending along a second direction; and a plurality of third truss elements defined by a plurality of third self-propagating polymer waveguides and extending along a third direction. The first, second, and third truss elements interpenetrate each other at a plurality of nodes to form a continuous material, and the three-dimensional structure is self-supporting.

The continuous material may substantially lack interior boundaries.

The first, second, and third truss elements may be adapted to axially transfer a mechanical load applied to the three-dimensional structure.

The first, second, and third truss elements may be adapted to provide the three-dimensional structure with a stretch-dominated behavior under a compression load applied to the three-dimensional structure.

The first, second, and third truss elements may be adapted to provide the three-dimensional structure with a compressive elastic modulus directly proportional to both a density of the three-dimensional structure and a modulus of a solid material portion of the three-dimensional structure.

The first, second, and third truss elements may be adapted to provide the three-dimensional structure with a compressive elastic modulus (E) determined by:

$$E = E_s(\sin^4 \theta)(\rho/\rho_s)$$

wherein $\rho$ is a density of the three-dimensional structure, $\rho_s$ is a density of a solid material portion of the three-dimensional structure, $\theta$ is an angle of at least one of the first, second and third truss elements relative to a compression surface of the three-dimensional structure, and $E_s$ is a modulus of the solid material portion of the three-dimensional structure.

Each of the first, second, and third truss elements may have an axial diameter of not greater than about 500 µm.

Each of the first, second, and third truss elements may have an axial diameter of not greater than about 10 µm.

The three-dimensional structure may define a free space of not less than about 40% by volume and not greater than about 99% by volume.

The three-dimensional structure may define a free space of not less than about 70% by volume and not greater than about 95% by volume.

Each of the first, second, and third truss elements may have molecular alignment extending along an axial direction thereof to produce an anisotropic material for providing substantial stiffness and/or strength along the axial direction.

Each of the nodes may be formed of the continuous material.

Each of the first, second and third truss elements may define an angle relative to a compression surface of the three-dimensional structure, and the respective angles defined by the first, second and third truss elements may be substantially equal to one another.

Each of the first, second, and third truss elements may include a photo-polymer material.

The structure may further include a plurality of fourth truss elements defined by a plurality of fourth self-propagating polymer waveguides and extending along a fourth direction. The first, second, third, and fourth truss elements interpenetrate each other to form the continuous material.

The structure may further include a plurality of fifth truss elements defined by a plurality of fifth self-propagating polymer waveguides and extending along a fifth direction. The first, second, third, fourth, and fifth truss elements interpenetrate each other to form the continuous material.

The structure may further include a plurality of sixth truss elements defined by a plurality of sixth self-propagating polymer waveguides and extending, along a sixth direction. The first, second, third, fourth, fifth, and sixth truss elements interpenetrate each other to form the continuous material.

The structure may further include a plurality of seventh truss elements defined by a plurality of seventh self-propagating polymer waveguides and extending along a seventh direction. The first, second, third, fourth, fifth, sixth, and seventh truss elements interpenetrate each other to form the continuous material.

The structure may further include a plurality of eighth truss elements defined by a plurality of eighth self-propagating polymer waveguides and extending along a eighth direction. The first, second, third, fourth, fifth, sixth, seventh, and eighth truss elements interpenetrate each other to form the continuous material.

In another embodiment of the present invention, a three-dimensional ordered open-cellular structure includes: a plurality of first polymer optical waveguide truss elements extending along a first direction; a plurality of second polymer optical waveguide truss elements extending along a second direction; and a plurality of third polymer optical waveguide truss elements extending along a third direction. The first, second and third polymer optical waveguide truss elements interpenetrate each other at a plurality of nodes to form a continuous material, and the three-dimensional structure is self-supporting.

The continuous material may substantially lack interior boundaries.

The first, second, and third polymer optical waveguide truss elements may be adapted to axially transfer a mechanical load applied to the three-dimensional structure.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

In the following detailed description, only certain exemplary embodiments of the present invention are shown and described, by way of illustration. As those skilled in the art would recognize, the described exemplary embodiments may be modified in various ways, all without departing from the spirit or scope of the present invention. Accordingly, the drawings and description are to be regarded as illustrative in nature, and not restrictive.

Figure 1:
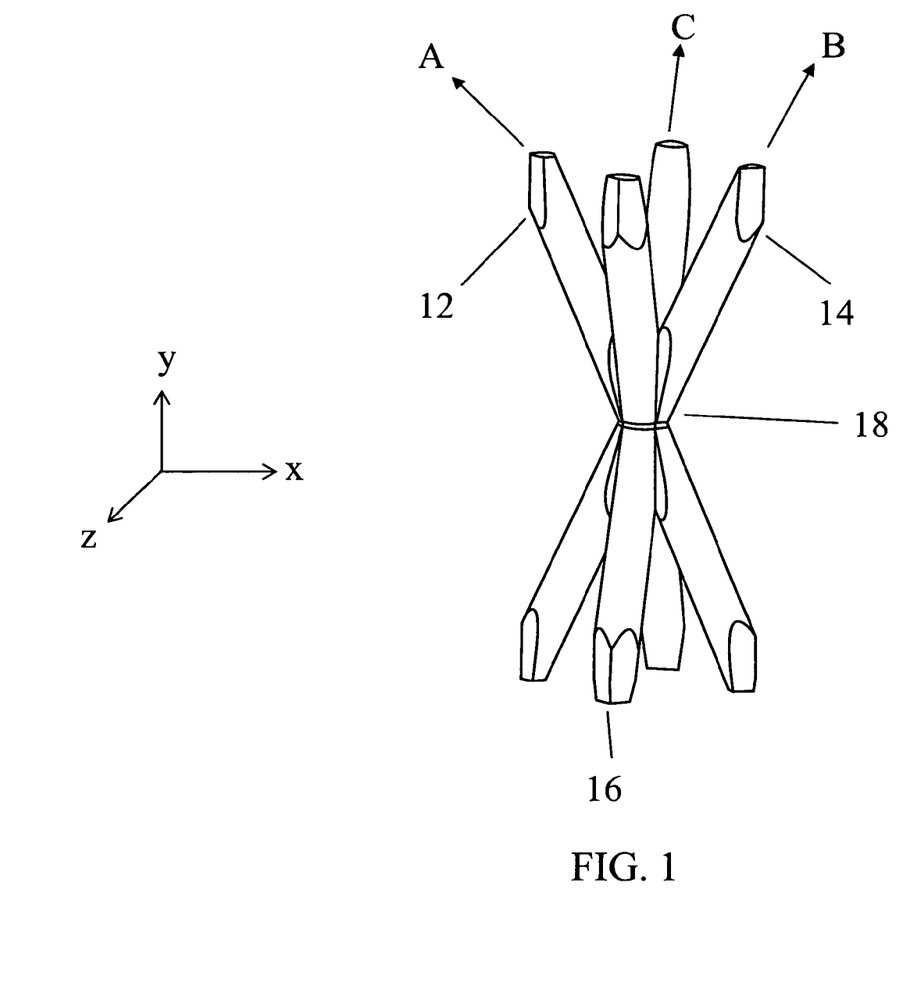
FIG. 1 is a perspective schematic view of a portion of a structure according to an embodiment of the present invention.
Figure 2:
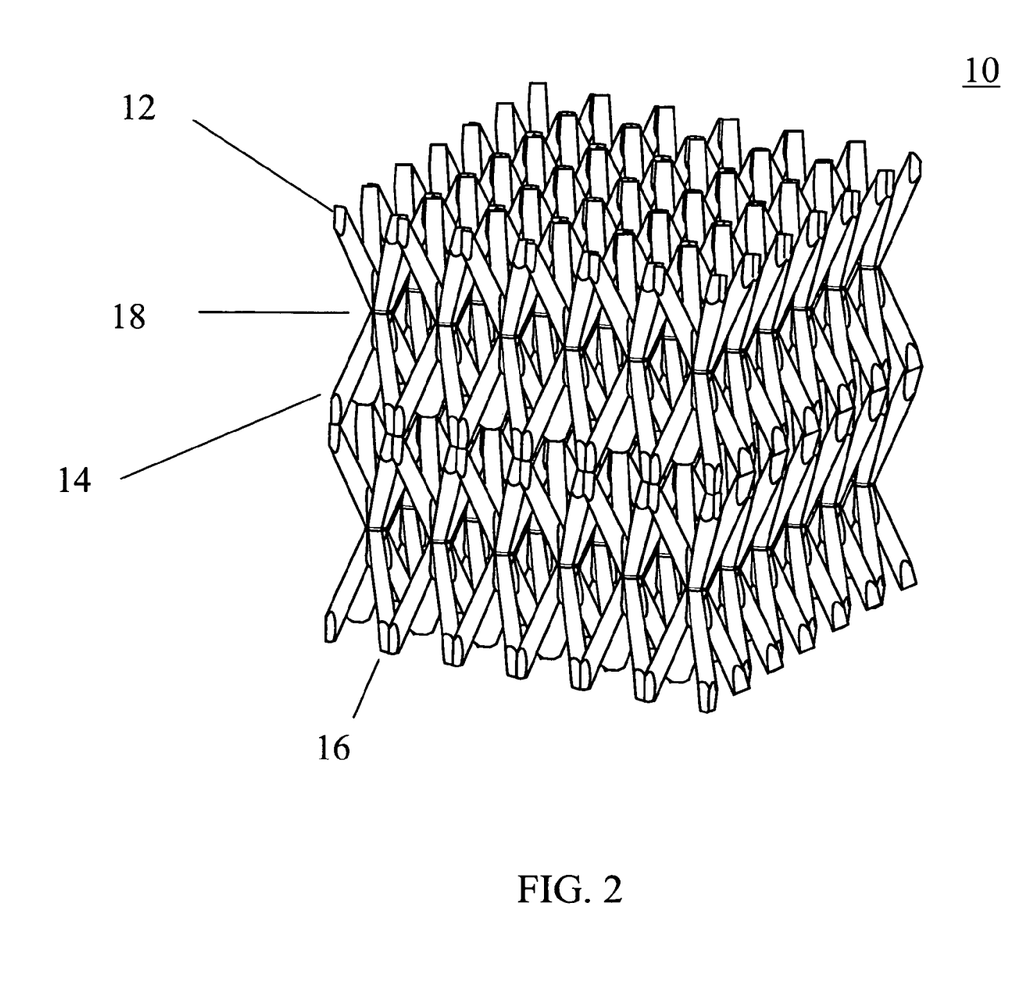
FIG. 2 is a perspective schematic view of a structure according to an embodiment of the present invention.

In one embodiment of the present invention, with reference to FIGS. 1 and 2, a three-dimensional ordered open-cellular structure 10 is a self-supporting structure. The structure 10 includes first truss elements 12, second truss elements 14, and third truss elements 16. The first truss elements 12 are defined by first self-propagating polymer waveguides and extend along a first direction A. The second truss elements 14 are defined by second self-propagating polymer waveguides and extend along a second direction B. The third truss elements 16 are defined by third self-propagating polymer waveguides and extend along a third direction C. With reference to FIGS. 1 and 2, the truss elements 12, 14, 16 interpenetrate each other at nodes 18 to form a continuous material.

In one embodiment, the truss elements 12, 14, 16 include a photo-polymer material. In one embodiment, the truss elements 12, 14, 16 are polymer optical waveguide truss elements.

In one embodiment, the continuous material is continuously formed such that it lacks any interior boundaries, e.g., boundaries within the interpenetrating portions of truss elements 12, 14, 16. In another embodiment, each node 18 of the structure 10 is formed of the continuous material.

According to one embodiment of the present invention, the structure 10 is formed by using a fixed light input (collimated UV light) to cure (polymerize) polymer optical waveguides, which can self-propagate in a 3D pattern. As such, the propagated polymer optical waveguides form the structure 10.

As disclosed in Monro et al. "Topical Review Catching Light In Its Own Trap," Journal Of Modern Optics, 2001, Vol. 48, No. 2, 191-238, which is incorporated by reference herein in its entirety, some liquid polymers, referred to as photopolymers, undergo a refractive index change during the polymerization process. The refractive index change can lead to a formation of polymer optical waveguides. If a monomer that is photo-sensitive is exposed to light (typically UV) under the right conditions, the initial area of polymerization, such as a small circular area, will "trap" the light and guide it to the tip of the polymerized region, further advancing that polymerized region. This process will continue, leading to the formation of a waveguide structure with approximately the same cross-sectional dimensions along its entire length.

According to one embodiment of the present invention, a mask with a two-dimensional pattern of apertures (see FIG. 3) is used to create a three-dimensional polymer microstructure.

Figure 3:
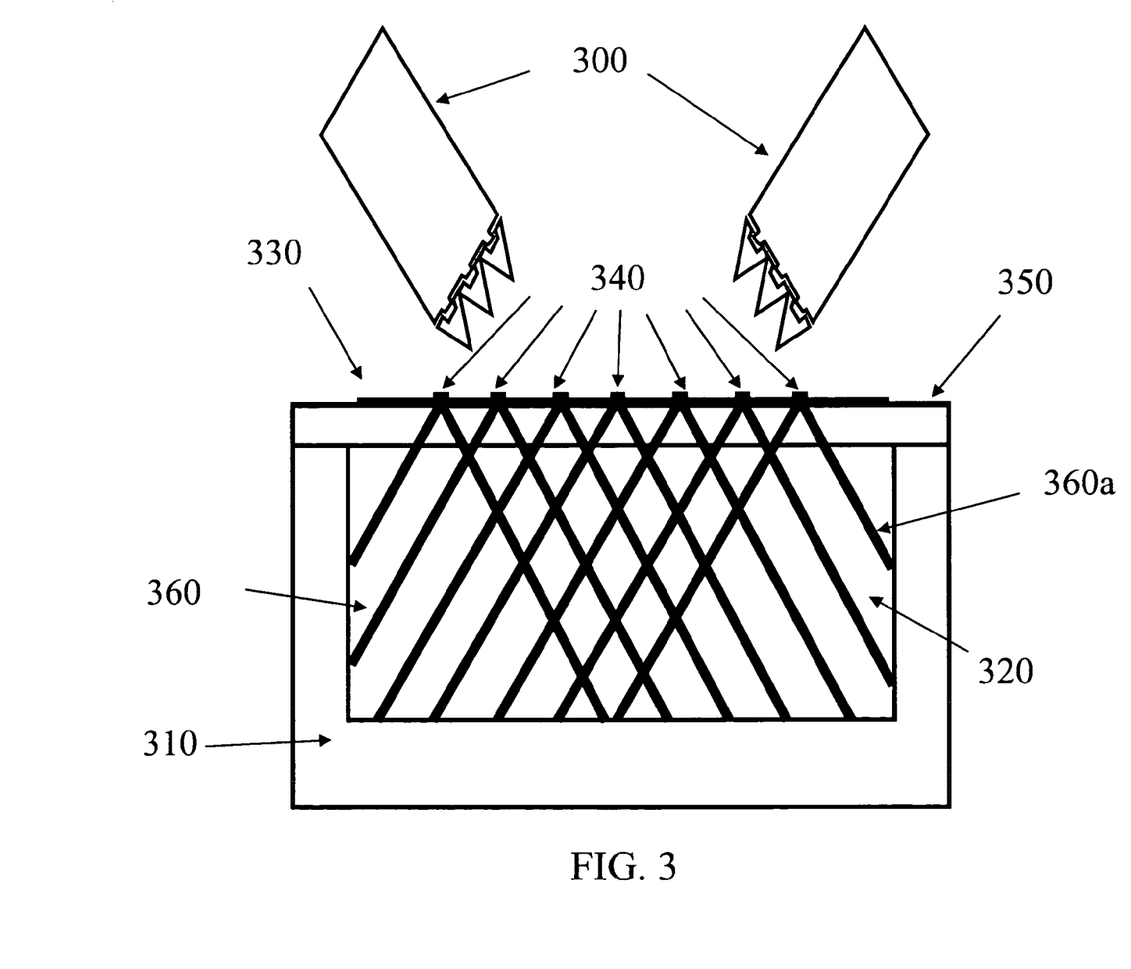
FIG. 3 is a schematic diagram of a system for forming a structure of an embodiment of the present invention from multiple waveguides created using a single collimated beam or multiple collimated beams through multiple apertures.
Figure 4A:
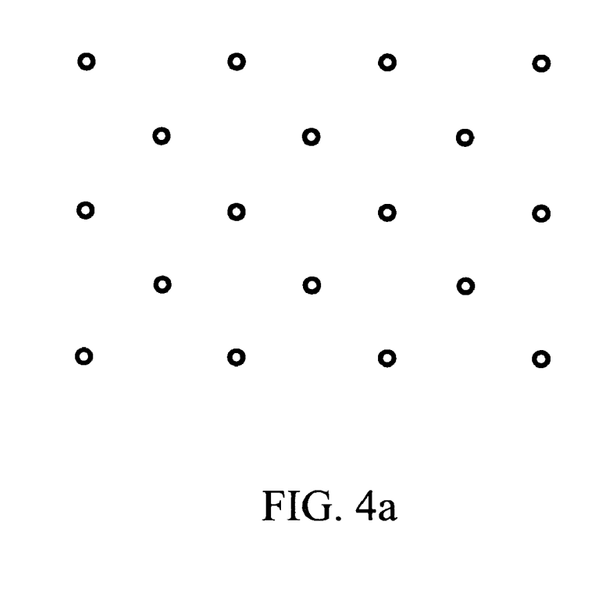
FIG. 4a illustrates an example of a square mask pattern (or a square mask aperture pattern) according to embodiments of the present invention.
Figure 4B:
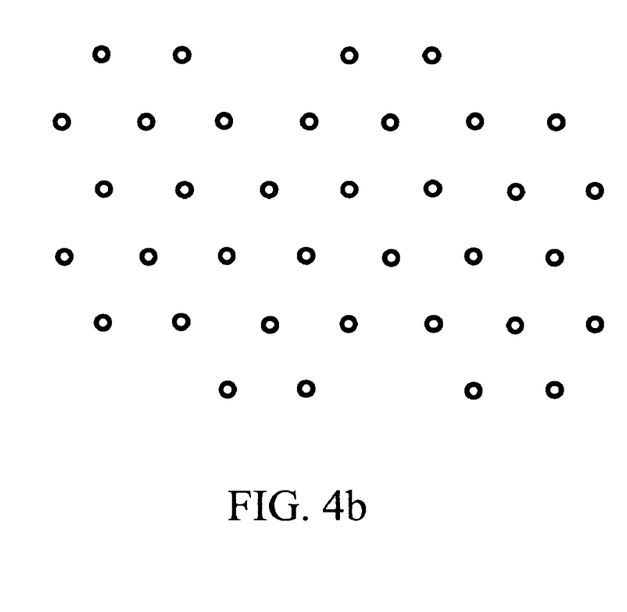
FIG. 4b illustrates an example of a hexagonal mask pattern (or a hexagonal mask aperture pattern) according to embodiments of the present invention.

With reference to FIG. 3, a system for forming a 3D polymer microstructure according to an embodiment of the present invention includes one or more collimated light sources 300, a reservoir (mold) 310 having a volume of monomer 320 that will polymerize at a wavelength of collimated light beams provided by the light sources 300, and a patterning apparatus, such as a mask 330 with multiple apertures (open areas) 340. Each of the apertures 340 has a given shape and dimension substantially matching a cross section geometry of a waveguide (e.g., waveguide 360a). Between the mask 330 and the monomer 320, there may be a substrate 350. Here, in FIG. 3, a truly 3D network can be formed because the intersecting polymer waveguides 360 will simply polymerize together, but will not interfere with waveguide propagation. Also, the spacing between the plurality of waveguides 360 corresponds with the pattern of the plurality of apertures 340. The pattern of the apertures 340 may, for example, be in a square pattern as shown in FIG. 4a and/or in a hexagonal pattern as shown in FIG. 4b. The hole (aperture) spacing, i.e., distance between apertures 340 in the mask 330, and the number of waveguides 360 formed from each of the apertures 340 will determine the open volume fraction (i.e. open space) of the formed 3D microstructure.

As such, through the system of FIG. 3, a 3D microstructure (or a 3D ordered polymer microstructure) of an embodiment of the present invention can be designed for a given application. The design parameters include: 1) the angle and pattern of the polymer waveguides with respect to one another, 2) the packing, or relative density of the resulting cellular structure (or the open volume fraction), and 3) the cross-sectional shape and dimensions of the polymer waveguides.

Figure 5:
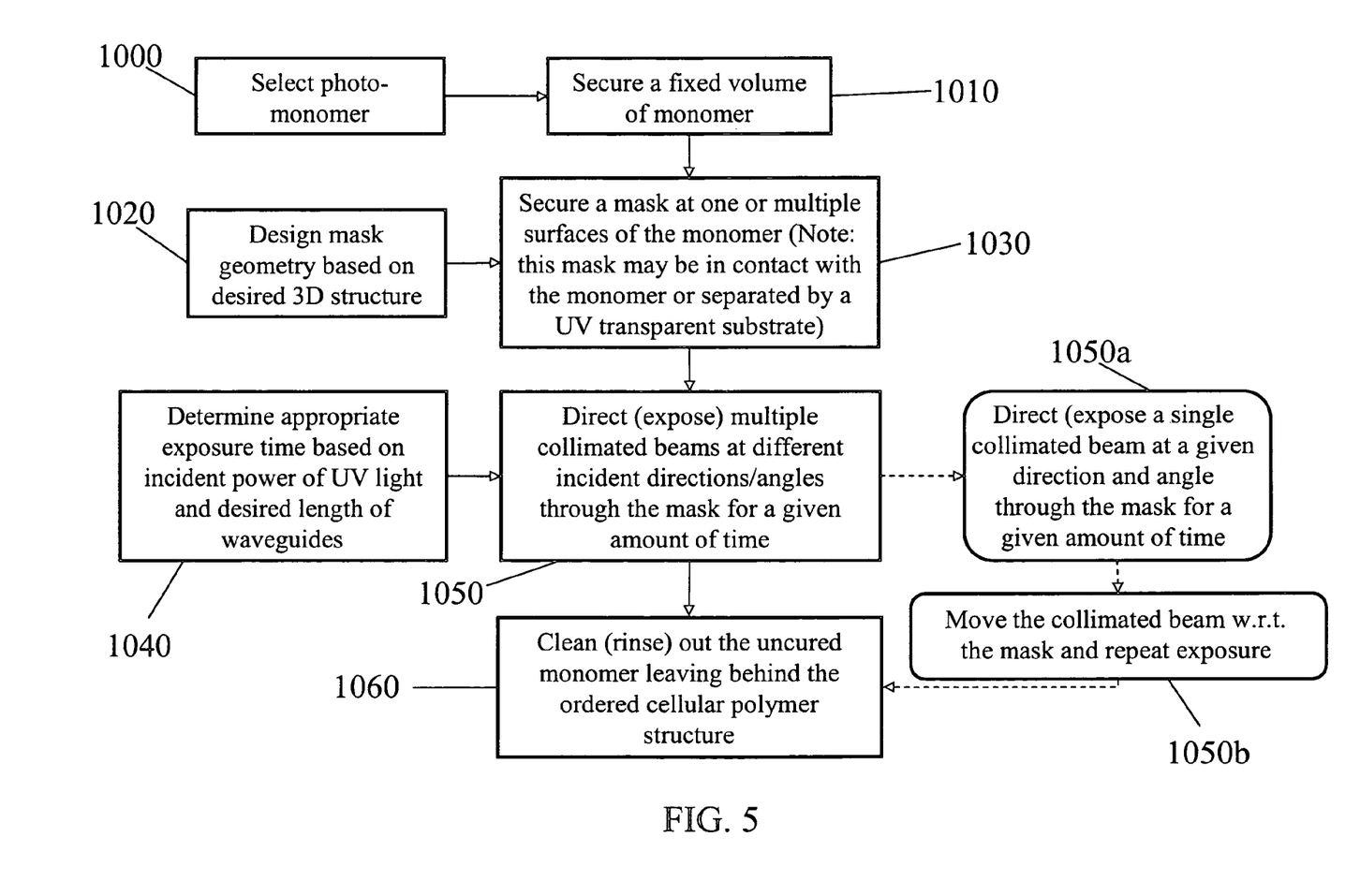
FIG. 5 is a process flow diagram for forming one or more polymer waveguides of a structure according to an embodiment of the present invention.

In more detail, FIG. 5 shows a method of forming a 3D ordered microstructure according to an embodiment of the present invention. As illustrated in FIG. 5, a photo-monomer is selected in block 1000. In block 1010, a volume of the selected photo-monomer is secured (e.g., in a reservoir). A mask geometry is designed based on a desired 3D structure in block 1020. A patterning apparatus, such as a mask having the designed geometry, is secured in block 1030. Here, the secured mask has at least one aperture between at least one collimated light source and the volume of the selected photo-monomer. In addition, the mask, may be in contact with the monomer or separated by a substrate (e.g., by a UV transparent substrate).

In block 1040, an appropriate exposure time is determined based on incident power of a collimated light beam from the at least one collimated light source (e.g., an incident power of an UV light) and a desired length of one or more waveguides. The collimated light beam from the at least one collimated light source is directed to the mask for a period of exposure time so that a portion of the collimated beam passes through the mask and is guided by the at least one aperture into the photo-monomer to form at least one waveguide through a portion of the volume of the photo-monomer. Here, the at least one waveguide has a cross sectional geometry substantially matching the designed aperture geometry on the mask.

In one embodiment as shown in block 1050, multiple collimated beams at different incident directions and/or angles are directed through the mask for a given amount of time.

Alternatively, as shown in blocks 1050a, a single collimated beam at a given direction and angle is directed through the mask for a given amount of time. Then, at block 1050b, the collimated light beam is moved with respect to the mask and the exposure is repeated.

Then, at block 1060, any uncured photo-monomer is removed to leave behind a 3D ordered polymer microstructure. Here, in one embodiment, the plurality of polymer waveguides are used to form the 3D ordered polymer microstructure, and the 3D ordered polymer microstructure corresponds with the pattern of the plurality of apertures.

The resulting 3D polymer microstructure can be formed in seconds in the area where exposed to the incident collimated beam. Since the incident light and the monomer remain fixed with respect to one another during the formation of a polymer waveguide, the exposure area of the collimated beam(s) can be scanned over a larger surface area of monomer, leading to the formation of large-area structures. Alternatively, in one embodiment, a volume of monomer can continuously be fed under a fixed incident light pattern (created from a mask and collimated light) leading to a path for mass production.

As described, once the polymer cellular structure is formed in the volume of monomer, the remaining un-polymerized material (monomer) is removed leaving an open cellular polymer material that is the ordered 3D microstructure. By way of example, a solvent that dissolves the monomer (but not the polymer) may be used to aid in the monomer removal.

Figure 6A:
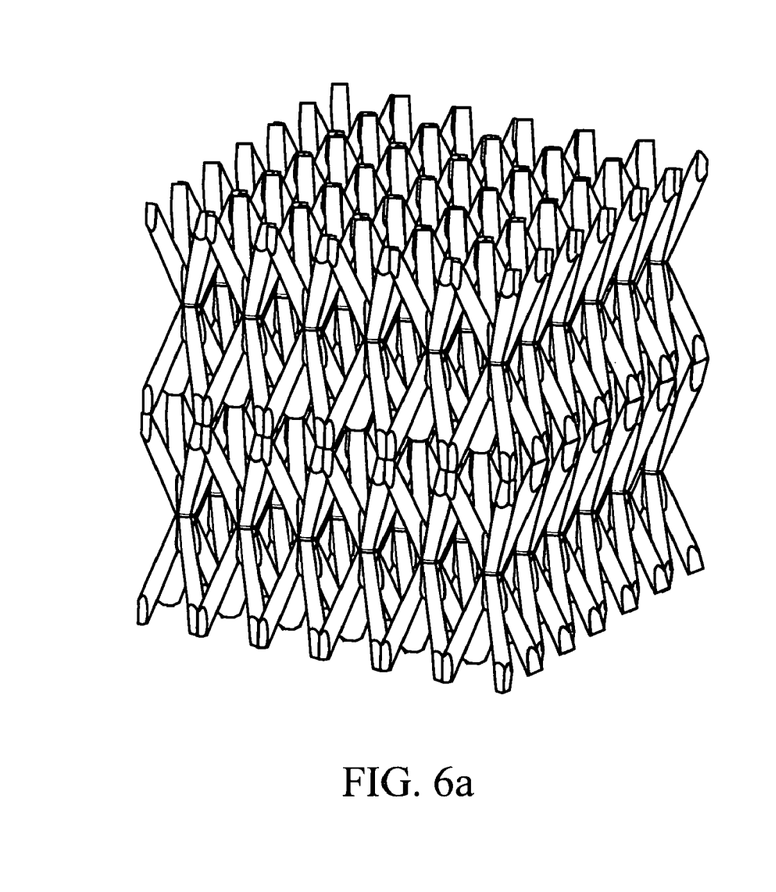
FIGS. 6a and 6b are SEM micrographs of a structure of an embodiment of the present invention.
Figure 6B:
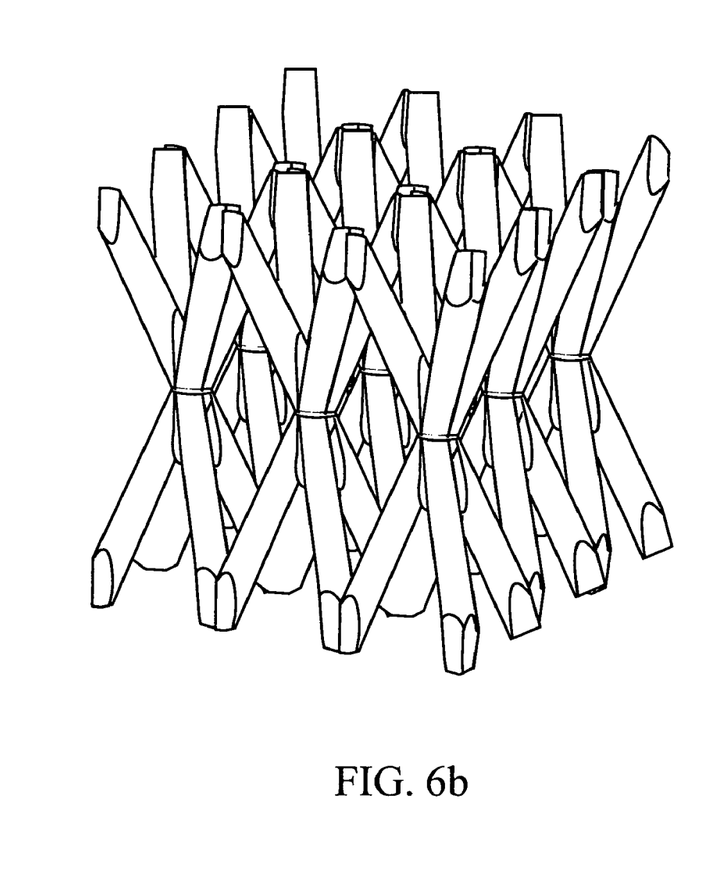

SEM micrographs of a sample 3D polymer microstructure that can be formed by the technique described above are shown in FIGS. 6a and 6b.

With reference back to FIGS. 1 and 2, the truss elements 12, 14, 16 of the structure 10 define an open volume (i.e. free space) of the structure 10. In one embodiment, the structure 10 defines a free space of not less than about 40% by volume and not greater than about 99% by volume. In another embodiment, the structure 10 defines a free space of not less than about 70% by volume and not greater than about 95% by volume.

The truss elements 12, 14, 16 intersect at the nodes 18 to form symmetrical angles in three dimensions (three orthogonal directions). The symmetrical angles relative to the xz-plane (see, FIG. 1), can measure between 0° and 90°. That is, truss elements 12, 14, 16 interpenetrate each other to form "perfect" nodes: each of the truss elements 12, 14; 16 defines an angle relative to a compression surface of the structure 10 (e.g. a surface extending along a direction of the xz-plane), and the respective angles defined by the truss elements 12, 14, 16 are substantially equal to one another. However, embodiments of the present invention are not limited thereto.

The truss elements 12, 14, 16 have an intrinsically high strength due to their small scale. In one embodiment, each of the truss elements 12, 14, 16 has an axial diameter of not greater than about 500 µm.

In another embodiment, each of the truss elements 12, 14, 16 has an axial diameter of not greater than about 200 µm. In another embodiment, each of the truss elements 12, 14, 16 has an axial diameter of not greater than about 10 µm. The truss elements 12, 14, 16 are configured to have a correspondingly small aspect ratio (e.g., length/diameter ratio) for withstanding a bending moment. Here, each of the truss elements 12, 14, 16 has a length not greater than 100 µm such that the truss elements can better withstand an mechanical load applied to the structure 10. As such, the truss elements 12, 14, 16 experience little, if any, bending deformation during application of the mechanical load to the structure 10.

At certain size scales (e.g., the size scales described above), the strength of the truss elements is increased, which corresponds to an increased strength of the structure 10. In one embodiment, each of the truss elements 12, 14, 16 has molecular alignment extending along an axial direction of the truss element. As such, an anisotropic material is produced, which provides a substantial degree of stiffness and/or strength along the axial direction. In one embodiment, in a material that is composed of long molecular chains (e.g., polymers), the molecules thereof can be aligned along a direction to provide an increased degree of mechanical strength and/or stiffness along the alignment direction. In more detail, where the molecular alignments of the truss elements 12, 14, 16 extend along the corresponding axial directions, the truss elements 12, 14, 16 are configured to axially transfer a mechanical load applied to the structure 10.

As described above, the structure 10 withstands the mechanical load, e.g., via axial tension and compression of the truss elements 12, 14, 16. Molecular alignment of the truss elements 12, 14, 16 along their respective axial directions lends additional strength and/or stiffness to the truss elements 12, 14, 16 and, accordingly, also to the structure 10.

In one embodiment, the truss elements 12, 14, 16 are configured to provide the structure 10 with a stretch-dominated behavior under a compression load applied to the structure 10. Such stretch-dominated behavior is contrasted from the bending-dominated behavior (e.g. of randomly oriented cellular structures), as described in Ashby, "The Properties Of Foam And Lattices," Philosophical Transactions—Royal Society Of London Series A Mathematical Physical And Engineering Sciences, Vol. 364, 2006, which is incorporated by reference herein in its entirety.

In a bending-dominated structure, the elastic modulus is proportional to the square of the relative density $\rho'/\rho_s'$, where $\rho'$ is the density of the cellular material and $\rho_s'$ is the density of the solid from which it is constructed. In contrast, a stretch-dominated structure (such as structure 10), has a compressive elastic modulus (E) directly proportional to both the relative density thereof and the modulus ($E_s$) of the solid material portion of the structure 10, as expressed in equation (1) below:

$$E = E_s(\sin^4\theta)(\rho/\rho_s) \quad (1)$$

where $\rho$ is a density of the structure 10, $\rho_s$ is a density of a solid material portion of the structure 10, $\theta$ is an angle of at least one of the truss elements 12, 14, 16 relative to a compression surface of the structure 10, and $E_s$ is a modulus of the solid material portion of the structure 10. As such, the elastic modulus of a structure of embodiments of the present invention is also proportional to a geometric function of the angle $\theta$ of the structure, and $\theta$ can accordingly be chosen to vary (e.g., increase or reduce) the elastic modulus.

Figure 7:
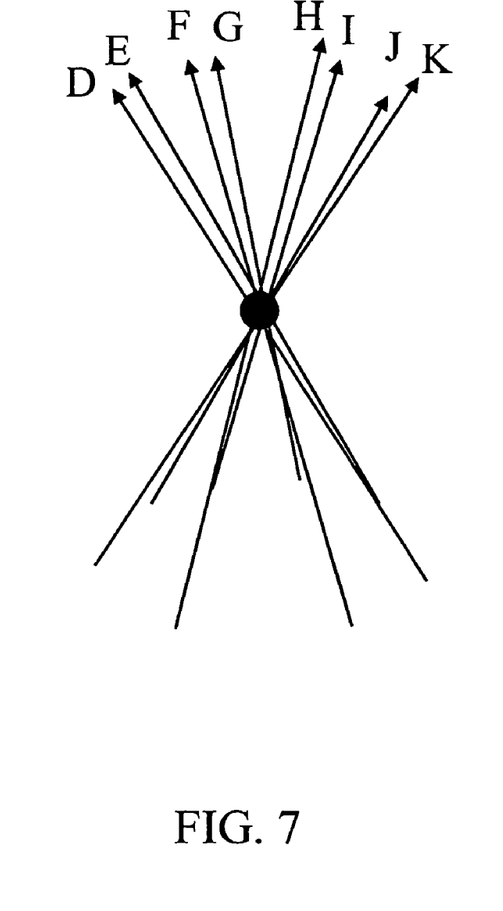
FIG. 7 is a perspective schematic view showing respective directions along which truss elements of a structure of an embodiment of the present invention extend.

With reference back to FIGS. 1 and 2, the structure 10 includes truss elements 12, 14, 16 respectively extending along A, B, and C directions. However, embodiments of the present invention are not limited thereto. For example, with reference to FIG. 7, a structure of an embodiment of the present invention may include truss elements defined by self-propagating polymer waveguides and extending along D, E, F, G, H, I, J and K directions, respectively. For example, a structure according to an embodiment of the present invention may include eight truss elements, each of which extends along a corresponding one of eight varying directions. Here, similar to the embodiment shown in FIGS. 1 and 2, the eight truss elements interpenetrate each to form nodes of a continuous material. However, embodiments of the present invention are not limited thereto, and may include more or fewer than eight truss elements.

In a further embodiment of the present invention, an open volume of a cellular structure is filled at least partially with a material different from the material of the cellular structure itself, thereby creating an ordered bi-phase composite. Also in a further embodiment of the present invention, one or more truss elements of a cellular structure are coated with a material different from the material of the cellular structural itself to adjust the thermal behavior thereof. Also in a further embodiment of the present invention, base elements of a cellular structure are coated with a material different from the material of the cellular structural itself, and the base elements are removed to create a self-supporting structure with having continuous but separated volumes.

The size scale and the features of structures of embodiments of the present invention can prove useful in applications such a biological growth template, assuming that a bio-compatible material is used for the structures. By way of example, other potential applications include (but are not limited to): energy absorbing materials for impact and/or ballistic protection; heat transfer applications including a cross-flow heat exchange or structural heat conductor or insulator; deployable structures (space structures); acoustic damping structures; hook and loop attachment surfaces; functionally graded structures; 3D batteries or fuel cells; catalyst support structures; filtration/separation structures; directional wicking materials; distributed lighting structures; sensor supports with high surface area; high friction/wear surfaces; and flame retardant structural foams.

While the invention has been described in connection with certain exemplary embodiments, it is to be understood by those skilled in the art that the invention is not limited to the disclosed embodiments, but, on the contrary, is intended to cover various modifications included within the spirit and scope of the appended claims and equivalents thereof.

What is claimed is:

1. A three-dimensional ordered open-cellular structure comprising:
    a plurality of nodes disposed in at least two parallel planes, each of the nodes being located at an intersection of at least three self-propagating polymer waveguides of at least:
        a plurality of first truss elements defined by a first plurality of self-propagating polymer waveguides and extending along a first direction;

a plurality of second truss elements defined by a second plurality of self-propagating polymer waveguides and extending along a second direction; and a plurality of third truss elements defined by a third plurality of self-propagating polymer waveguides and extending along a third direction, wherein all waveguides of each of the first plurality, second plurality, and third plurality of self-propagating polymer waveguides are parallel to each other and substantially straight, wherein the first plurality of self-propagating polymer waveguides intersect with the second plurality of self-propagating polymer waveguides at the nodes to define the parallel planes, and wherein the third plurality of self-propagating polymer waveguides intersect with the parallel planes at non-perpendicular angles.

2. The three-dimensional ordered open-cellular structure of claim 1, wherein the first plurality, second plurality, and third plurality of self-propagating polymer waveguides interpenetrate each other at the nodes to form a continuous material.

3. The three-dimensional ordered open-cellular structure of claim 2, wherein the continuous material substantially lacks interior boundaries.

4. The three-dimensional ordered open-cellular structure of claim 2, wherein each of the nodes is formed of the continuous material.

5. The three-dimensional ordered open-cellular structure of claim 1, wherein the first plurality, second plurality, and third plurality of self-propagating polymer waveguides are configured to axially transfer a mechanical load applied to the three-dimensional ordered open-cellular structure.

6. The three-dimensional ordered open-cellular structure of claim 1, wherein the first plurality, second plurality, and third plurality of self-propagating polymer waveguides are configured to provide the three-dimensional ordered open-cellular structure with a stretch-dominated behavior under a compression load applied to the three-dimensional ordered open-cellular structure.

7. The three-dimensional ordered open-cellular structure of claim 1, wherein the first plurality, second plurality, and third plurality of self-propagating polymer waveguides are configured to provide the three-dimensional ordered open-cellular structure with a compressive elastic modulus directly proportional to both a density of the three-dimensional ordered open-cellular structure and a modulus of a solid material portion of the three-dimensional ordered open-cellular structure.

8. The three-dimensional ordered open-cellular structure of claim 1, wherein the first plurality, second plurality, and third plurality of self-propagating polymer waveguides are configured to provide the three-dimensional ordered open-cellular structure with a compressive elastic modulus (E) determined by:

$$E = E_s (\sin^4 \theta)(\rho/\rho_s)$$

wherein $\rho$ is a density of the three-dimensional ordered open-cellular structure, $\rho_s$ is a density of a solid material portion of the three-dimensional ordered open-cellular structure, $\theta$ is an angle of at least one of the first, second and third truss elements relative to a compression surface of the three-dimensional ordered open-cellular structure, and $E_s$ is a modulus of the solid material portion of the three-dimensional ordered open-cellular structure.

9. The three-dimensional ordered open-cellular structure of claim 1, wherein each of the first plurality, second plurality, and third plurality of self-propagating polymer waveguides has an axial diameter of not greater than about 500 µm.

10. The three-dimensional ordered open-cellular structure of claim 1, wherein each of the first plurality, second plurality, and third plurality of self-propagating polymer waveguides has an axial diameter of not greater than about 10 µm.

11. The three-dimensional ordered open-cellular structure of claim 1, wherein the three-dimensional ordered open-cellular structure defines a free space of not less than about 40% by volume and not greater than about 99% by volume.

12. The three-dimensional ordered open-cellular structure of claim 1, wherein the three-dimensional ordered open-cellular structure defines a free space of not less than about 70% by volume and not greater than about 95% by volume.

13. The three-dimensional ordered open-cellular structure of claim 1, wherein each of the first plurality, second plurality, and third plurality of self-propagating polymer waveguides has a molecular alignment extending along an axial direction thereof to produce an anisotropic material for providing substantial stiffness and/or strength along the axial direction.

14. The three-dimensional ordered open-cellular structure of claim 1,
wherein each of the first plurality, second plurality, and third plurality of self-propagating polymer waveguides defines an angle relative to a compression surface of the three-dimensional ordered open-cellular structure, and
wherein the respective angles defined by the first plurality, second plurality, and third plurality of self-propagating polymer waveguides substantially equal to one another.

15. The three-dimensional ordered open-cellular structure of claim 1, wherein each of the first plurality, second plurality, and third plurality of self-propagating polymer waveguides comprises a photo-polymer material.

16. The three-dimensional ordered open-cellular structure of claim 1, comprising a plurality of fourth truss elements defined by a fourth plurality of self-propagating polymer waveguides and extending along a fourth direction, all of the fourth plurality of self-propagating polymer waveguides being parallel to each other and substantially straight, wherein the fourth plurality of self-propagating polymer waveguides intersect with the first plurality, second plurality, and third plurality of self-propagating polymer waveguides at the nodes to form a continuous material.

17. The three-dimensional ordered open-cellular structure of claim 16, further comprising a plurality of fifth truss elements defined by a fifth plurality of self-propagating polymer waveguides and extending along a fifth direction, all of the fifth plurality of self-propagating polymer waveguides being parallel to each other and substantially straight, wherein the fifth plurality of self-propagating polymer waveguides intersect with the first plurality, second plurality, third plurality, and fourth plurality of self-propagating polymer waveguides at the nodes to form a continuous material.

18. The three-dimensional ordered open-cellular structure of claim 17, comprising a plurality of sixth truss elements defined by a sixth plurality of self-propagating polymer waveguides and extending along a sixth direction, all of the sixth plurality of self-propagating polymer waveguides being parallel to each other and substantially straight, wherein the sixth plurality of self-propagating polymer waveguides intersect with the first plurality, second plurality, third plurality, fourth plurality, and fifth plurality of self-propagating polymer waveguides at the nodes to form a continuous material.

19. The three-dimensional ordered open-cellular structure of claim 18, further comprising a plurality of seventh truss elements defined by a seventh plurality of self-propagating polymer waveguides and extending along a seventh direction, all of the seventh plurality of self-propagating polymer waveguides being parallel to each other and substantially straight, wherein the seventh plurality of self-propagating polymer waveguides intersect with the first plurality, second plurality, third plurality, fourth plurality, fifth plurality, and sixth plurality of self-propagating polymer waveguides at the nodes to form a continuous material.

20. The three-dimensional ordered open-cellular structure of claim 18, further comprising a plurality of eighth truss elements defined by an eighth plurality of self-propagating polymer waveguides and extending along an eighth direction, all of the eighth plurality of self propagating polymer waveguides being parallel to each other and substantially straight, wherein the eighth plurality of self-propagating polymer waveguides intersect with the first plurality, second plurality, third plurality, fourth plurality, fifth plurality, sixth plurality, and seventh plurality of self-propagating polymer waveguides at the nodes to form a continuous material.

21. A three-dimensional ordered open-cellular structure comprising:
   a plurality of nodes disposed in at least two parallel planes, each of the nodes being located at an intersection of at least three polymer optical waveguide truss elements of at least:
      a plurality of first polymer optical waveguide truss elements defined by a first plurality of self-propagating polymer waveguides and extending along a first direction;
      a plurality of second polymer optical waveguide truss elements defined by a second plurality of self-propagating polymer waveguides and extending along a second direction; and
      a plurality of third polymer optical waveguide truss elements defined by a third plurality of self-propagating polymer waveguides and extending along a third direction,
   wherein all polymer optical waveguide truss elements of each of the first plurality, second plurality, and third plurality of self-propagating polymer waveguides are parallel to each other and substantially straight,
   wherein the first plurality of polymer optical waveguide truss elements intersect with the second plurality of polymer optical waveguide truss elements at the nodes to define the parallel planes, and
   wherein the third plurality of polymer optical waveguide truss elements intersect with the parallel planes at non-perpendicular angles.

22. The three-dimensional ordered open-cellular structure of claim 21, wherein the first plurality, second plurality, and third plurality of polymer optical waveguide truss elements interpenetrate each other at the nodes to form a continuous material.

23. The three-dimensional ordered open-cellular structure of claim 22, wherein the continuous material substantially lacks interior boundaries.

24. The three-dimensional ordered open-cellular structure of claim 22, wherein the first plurality, second plurality, and third plurality of polymer optical waveguide truss elements are configured to axially transfer a mechanical load applied to the three-dimensional ordered open-cellular structure.

* * * * *